INVENTORS
JAMES L. CARLTON
BRUNO MENIN
BY
Van Deventer & Grier
ATTORNEYS

July 18, 1950 J. L. CARLTON ET AL 2,515,862
OPTICAL DEVICE

Filed Oct. 25, 1947 3 Sheets-Sheet 2

INVENTORS
JAMES L. CARLTON
BRUNO MENIN
BY
VanDeventer & Grier
ATTORNEYS

July 18, 1950 J. L. CARLTON ET AL 2,515,862
OPTICAL DEVICE

Filed Oct. 25, 1947 3 Sheets-Sheet 3

INVENTORS
JAMES L. CARLTON
BRUNO MENIN
BY
*Van Deventer & Grier*
ATTORNEYS

Patented July 18, 1950

2,515,862

UNITED STATES PATENT OFFICE 2,515,862

OPTICAL DEVICE

James L. Carlton, New York, and Bruno Menin, Ozone Park, N. Y., assignors to Saul Jeffee, New York, N. Y.

Application October 25, 1947, Serial No. 782,206

16 Claims. (Cl. 88—24)

This invention relates to improvements in optical devices and has for an object the provision of a device which can be used for a number of purposes some of which, by way of illustration, are described herein.

An object of the invention is to produce a compact, efficient optical device that can be used as a light accumulating-projector whereby light from a plurality of sources can be combined at a single focal point at which the intensity of the light will be greater than at any one of the points of origin.

Another object of the invention is the provision of an optical device that can be used with cathode-ray tubes such as are employed with television in order that the image from a number of relatively small tubes may be combined to produce an image of higher illumination than that of the individual tubes or a larger image of sufficient illumination to be observed than could be obtained from a single tube of much larger diameter than is commonly employed.

A further object is to provide a compact and efficient device for simultaneously making a number of positive films from a negative film at one run of the films, thereby eliminating wear on the sprocket holes in the negative film and greatly expediting the making of copies thereof.

Other objects and advantages will be apparent from the following specification taken together with the accompanying drawings which illustrate preferred embodiments of the invention.

It will be understood, however, that what is disclosed here is merely illustrative and not limitative, the invention being as defined in the appended claims.

Figure 1:
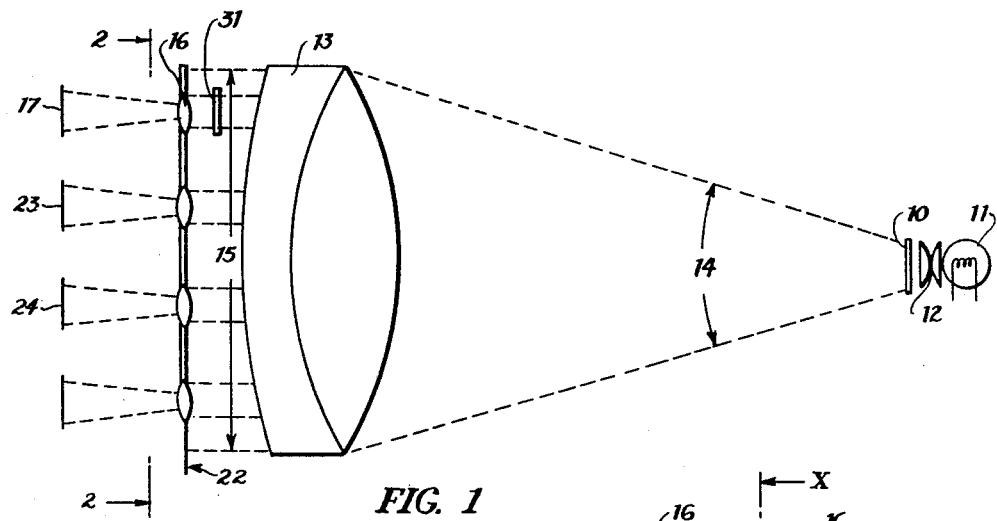
Figure 1 is a diagram on the line X, X, Figure 2 illustrating the optical principles of the invention using a large lens 13.

Referring to Figure 1, if a film 10 is illuminated in the usual manner such as light source 11 and condenser 12, and placed in the principal focus of an optical member such as a suitable lens 13, the image cone of light entering the lens will be as indicated by dotted lines 14 and the light leaving the lens will be a parallel beam filling the entire cylinder of projection from the lens indicated at 15.

If a lens 16 is now placed at any point in the cylinder of projection 15, said lens will form an image at 17 of the film 10, the size of said image 17 depending upon the characteristics of lens 16.

As many lenses 16 can be employed with a single lens 13 as the diameter of the latter will permit and any spacing of the lenses 16 within the cylinder of projection 15 may be employed.

Figure 2:
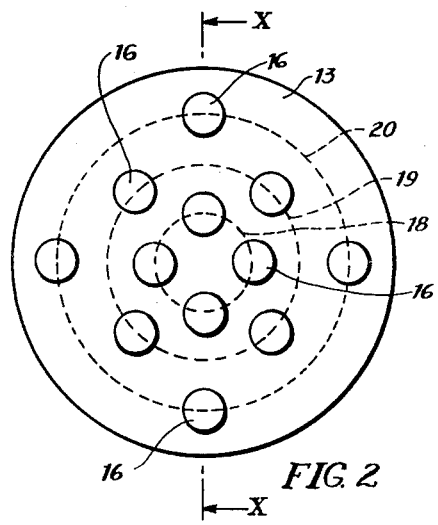
Figure 2 is a diagram showing the relative arrangement of the lenses Figure 1, on the line 2, 2 of Figure 1.

Referring to Figure 2, the lenses 16 can be mounted with their axes centered on the concentric lines 18, 19, 20, or arranged in any other manner, the optical axes of lenses 16 being parallel to the optical axis of lens 13, so that each of the lenses 16 lies perpendicular to the emergent parallel light beams from lens 13. To the lenses 16, the image of film 10 is at infinity, therefore the lenses 16 may be placed at any point along the emergent light beam from lens 13.

In Figure 1 the lenses are shown all in one plane at the point 22, but they could be either to the right or left of this point and in different planes, depending upon the characteristics desired in the images 17.

For example, to use the device as a projection printer, by an arrangement of lenses 16 of suitable focal lengths and other characteristics, it is possible to simultaneously make a 35 mm. positive print at 17, a 16 mm. print at 23 and an 8 mm. print at 24, or various other size prints, all from the 35 mm. negative film at 10. This is accomplished by a proper selection of lenses 16 and their location along the cylinder of light 15 as above described.

If all the lenses 16 are of the same focal length and all of them are located in the same plane 22, then all the images 17, 23, 24 will be of the same size. Assuming that there are eight lenses 16, then at each exposure of the films, such as 17, 23, 24, there will be made simultaneously, eight prints of the image on negative film 10.

Figure 3:
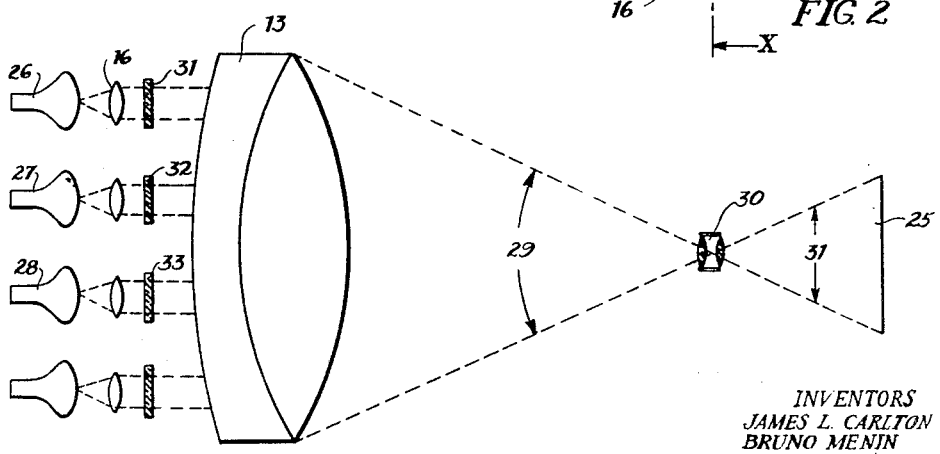
Figure 3 is a diagram on the line X, X, Figure 2 of an apparatus embodying the principles disclosed in Figures 1 and 2 but including light or television projecting means.

In Figure 3 the device is illustrated as a light accumulator-projector where it is desired to accumulate light from a number of sources and project same to a single surface, such as the screen 25. Here a plurality of light sources, such as lamps 26, 27, 28 are located in the rear focus of lenses 16 and the light from these lamps is projected in parallel beams to the lens 13. At the focal point of the emergent beam 29 a suitable projection lens 30 is placed, which projects the emergent beam 31 to screen 25.

If the screen is the same in area as the projected face of one of the lamps 26, and there are eight lamps, the screen will be approximately eight times brighter than the lamp. Some light will be lost in transmission, but with a properly designed optical system this loss will be only a small per cent of the total light of the lamps.

If screen 25 is smaller, it will be brighter, and if larger, correspondingly less bright, all in accordance with the known laws of optics.

If color filters 31, 32, 33 are placed in the light beams from lenses 16, the resultant color on screen 25 will be a composite of the color components 31, 32, 33.

Obviously the filters can be used in the arrangement Figure 1 where a filter is shown at 31, and such a filter can be applied to some or all of the lenses 16. Filters of different colors can be used for each positive film if desired, with any of the arrangements shown, and the filters can be placed anywhere in front of or behind the lenses in the light path.

If the light sources 26, 27, 28 are motion picture projectors operated in synchronism, the resultant image on screen 25 will be a composite of the three images projected by the projectors, or a composite of any other number of such images as may be projected.

If the light sources 26, 27, 28 are cathode ray tubes such as used in television, all simultaneously showing the same image, the resultant image on screen 25 will be the same, but the intensity of illumination will be that of the number of tubes used. If the screen 25 is the same area as a tube 26 and there are eight tubes the image on screen 25 will be approximately eight times brighter than that of the tube.

Obviously the schematic arrangements shown in Figures 1, 2 and 3 present difficulties when an attempt is made to embody the invention in a practical apparatus for many purposes, such for example as the film printer, light multiplier and other devices just described. A lens 13 in such devices would be from eight to twenty-four inches in diameter to obtain the desired result, and would be very expensive for most purposes and subject to chromatic aberration. The following embodiment of the invention, therefore, illustrate how the inventive concept illustrated in the diagrammatic drawings, Figures 1, 2 and 3, is applied to apparatus that can be easily constructed at a reasonable cost and which is therefore practical for commercial use in the arts.

Figure 4:
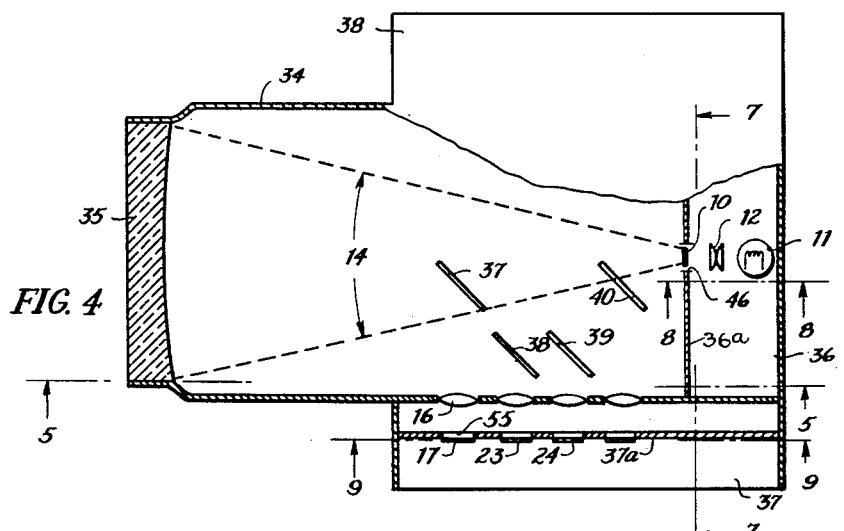
Figure 4 is a horizontal sectional view of apparatus embodying the principles of Figure 3, but having a mirror in place of lens 13 and auxiliary mirrors to direct light to the lenses 16 when same are disposed with their axes at an angle to the axis of the mirror, being particularly suited to making a plurality of duplicate positive films from a single negative.

Referring to Figure 4, the numeral 34 denotes a suitable casing in one end of which is mounted the spherical, or otherwise properly figured focussing mirror 35. For the sake of illustration this may have a focal length of twenty-four inches. The negative film 10 is positioned at the principal focus of the mirror. The condensing lens 12 and lamp 11 are housed in a compartment 36 of the casing, along with the means for moving film 10 to be presently described.

A plurality of beam-deflecting members, such as mirrors or prisms, four of which are shown at 37, 38, 39, 40, are positioned out of the cone of light 14, between the film and the mirror, so as to intercept parallel beams of light reflected from the mirror and project these beams through lenses 16 to impress images on films 17, 23, 24. The lenses 16 in this example may have a focal length of 1½-inches and are photo-visual reproduction lenses f8. The beam deflecting members may have their optical surfaces figured to give any desired corrective or other effect.

The films 17, 23, 24 and the means for moving them are housed in the light-tight compartment 37 of the casing. By this arrangement the film feeding mechanism is made accessible and the lenses 16 may be separated from each other sufficiently to permit film to be fed past them.

While only four lenses 16 and mirrors 37 to 40 inclusive are shown in Figure 4, it will be understood that a like number of lenses 16 and their associated mirrors may be mounted in the opposite side of the device where there is a light-tight compartment 38 in all respects like compartment 37 and containing four lenses 16 and their accompanying mirrors, like 37 to 40 inclusive, and films, like 17, 23 and 24.

Figures 5, 6:
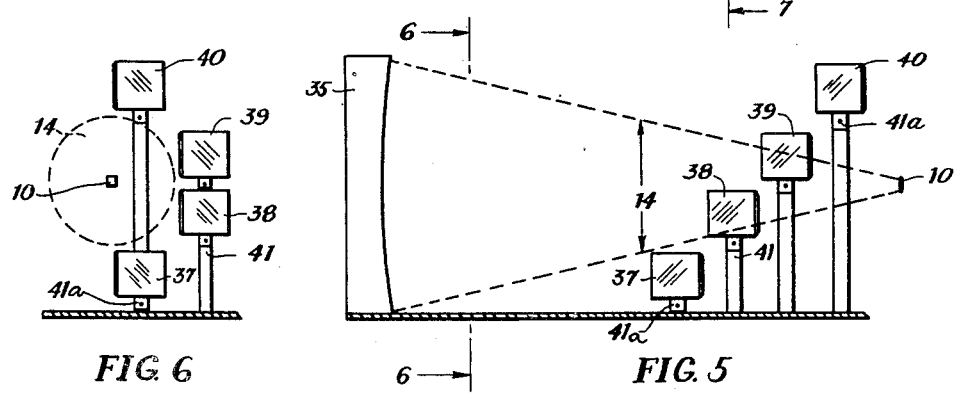
Figure 5 is a sectional diagrammatic view on the line 5, 5 of Figure 4.
Figure 6 is a diagrammatic sectional view on the line 6, 6 of Figure 5.

Figure 5 is a view on the line 5, 5 of Figure 4 and shows the mirrors 37 to 40 inclusive standing in front of the light cone 14 so as not to interfere with same.

Figure 6 is a view on the line 6, 6, Figure 5 and shows how the mirrors 37 to 40 inclusive are out of the light cone, the diameter of which is shown at 14, Figures 4, 5 and 6. The small mirrors, such as 37, can be made vertically adjustable on their supporting shafts, such as 41 by means of set screws 41a, and can also be axially adjustable about said shafts so as to permit of any desired adjustment of said mirrors in respect to the main mirror 35.

Figure 7:
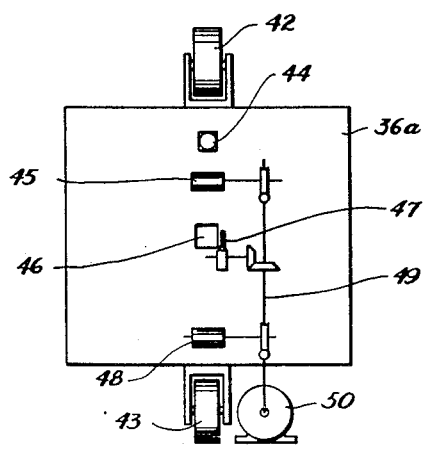
Figure 7 is a diagram of the apparatus on the line 7, 7 of Figure 4.

Figure 7 is a view on the line 7, 7 of Figure 4 of the front wall of the compartment 36 and shows the film 10, its feeding mechanism and other parts, to be presently referred to, supported on wall 36a.

The numeral 42 denotes the usual delivery reel for film and 43 denotes the take-up reel. These reels may be driven in the usual manner. The film is brought down past the usual sound lamp house 44 and over the usual feed sprocket 45. It then passes the framing aperture or film gate 46, past which it is moved by any suitable intermittent driving mechanism, such as that diagrammatically indicated at 47.

The film then encounters the take-up sprocket 48 and is finally wound up on the take-up reel 43.

The feed sprocket 45, the intermittent or claw mechanism 47, and the take-up sprocket 48 are geared to a suitable driving shaft 49 driven by the usual electrical motor 50.

Figure 8:
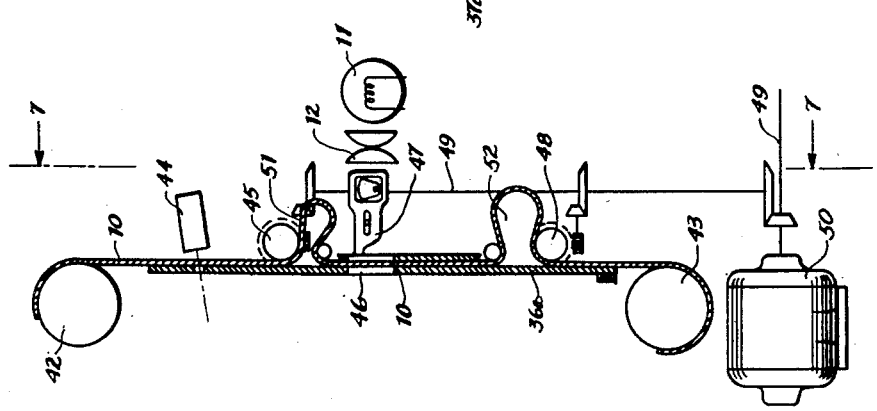
Figure 8 is a diagram of the apparatus on the line 8, 8 of Figure 4.

A side view of the negative film mechanism just described is shown in Figure 8, and attention is called to the fact that the film 10 encounters the sound lamp house 44 while in uniform motion and before it is given an intermittent motion by the claw mechanism. The sound lamp and lens is of the usual construction and is tilted slightly, as shown in Figure 8 so as to project the sound track to mirror 35 in proper position alongside the images from film 10.

A loop 51 is put in the film after it passes the feed sprocket 45 and before it encounters the usual claw mechanism.

A second loop 52 is placed in the film after it passes the intermittent mechanism 47 and before the film encounters the take-up sprocket 48.

Figure 9A:
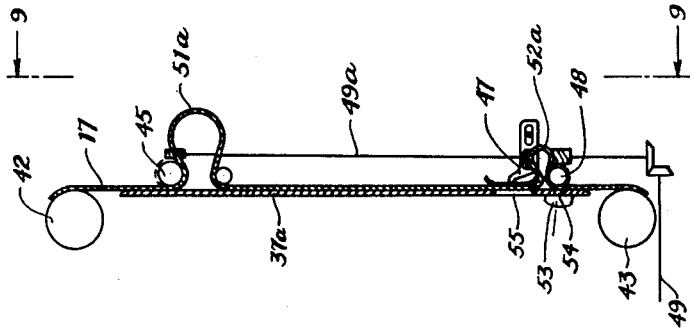
Figure 9a is a side view on the line 9a, 9a of Figure 9.
Figure 9:
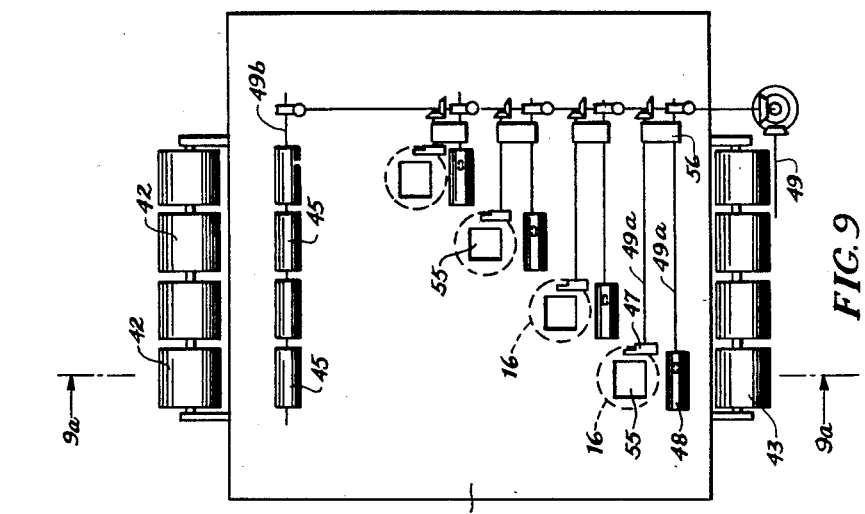
Figure 9 is a diagram of the apparatus on the line 9, 9 of Figure 4.

Figure 9 is a view of the rear wall 37a of the compartment 37 shown in Figure 4 on which the positive films are mounted and shows the equipment mounted thereon.

There is a suitable lens system 53, Figure 9a, associated with each one of the positive films adapted to receive the image of the sound track projected by the sound lamp house 44 and the usual lens system therein shown in Figures 7 and 8, from mirror 35 to the lens system 53, via one of the lenses 16 and its associated beam deflecting member.

Associated with each one of the lens systems 53 is the usual sound slit 54 adapted to define the sound track on the positive film. The lens system 53 may be placed at an angle to receive the image of the sound track.

Each film, such for example 17, passes downward from the delivery reel over the feed sprocket 45 to the feed mechanism or claw 47, over the take-up sprocket 48, past lens system 53 and slit 54 and is finally received on the take-up reel 43.

The film gates, such as 55, define the image spaces on the films in the usual manner and the feed sprockets 45, the claw mechanism 47, take-up sprockets 48 are all driven in timed relation by the shafts 49 which, in turn, are driven by the motor 50. Each film in 37 may have loops 51a, 52a, same as loops 51 and 52 previously described.

Figure 9a is a view taken at right angles to Figure 9 at 9a, 9a, and is self-explanatory in view of what has been said about Figure 8, as the driving mechanism in Figures 9 and 9a is a duplicate of that shown in Figure 8, except for four films instead of one.

It will be seen from the foregoing that as the negative film 10 is advanced frame by frame, so are the positive films, such as 17; and therefore, there are as many positive prints made simultaneously as there are optical systems, each system comprising a mirror such as 37, and a lens 16 and a film 17, and means for moving the latter in timed relation to the negative film 10.

It will be seen by referring to Figures 9 and 9a that the sound track is put on the film, such as 17, while same is flowing in timed relation to the negative film 10 and not while the film is moving intermittently through picture exposure opening 55.

From a study of Figures 5 and 6, it will at once be apparent how a light-accumulator-projector as described in connection with Figure 3 can be devised, employing the arrangement of small mirrors as shown in connection with Figures 5 and 6. It is only necessary to place the lamps or other devices 26, 27 in front of the secondary mirrors 37—40, inclusive, in a position occupied by the lens at 16, Figure 4, and the lens 30 of Figure 3 will then occupy the position occupied by the film 10 in Figure 4, the condenser 12 and lamp 11 being omitted, and screen 25 being located in the rear of the lens. On account of the obviousness of this arrangement, it is not deemed necessary to describe same in detail. It may be pointed out, however, that if the lamps 26, 27 and 28 were television tubes having their viewing ends three or four inches in diameter, it would be difficult to associate a quantity of these tubes with a lens, such as shown in Figures 1 and 2, but it would be easy to associate a quantity of the tubes with a main mirror 35 as shown in Figure 4, because the tubes could be spaced along the axis of the mirror by use of secondary mirrors 37—40, inclusive, a set of each being located on each side of the light cone 14.

Obviously, the device, Figures 4 to 9a, inclusive, may be regarded as a camera-projector or printer, although it can be modified and used for other purposes. If it is desired to make different size film with the device of Figures 4 to 9a inclusive, it is necessary to change the gear ratio between the motor 50 and each set of driving mechanism for one of the films. These change-speed gears can be inserted at any suitable place in the mechanism, such as at 56, between motor shaft 49 and the individual driving shafts 49a for each film. When this is done, the feed sprockets 45, Figure 9, are each driven individually from shaft 49a, as shown in Figure 9a, instead of by a common shaft as shown at 49b, Figure 9. 56 can be set for 70 mm. film, for 35 mm. film, for 16 mm. film, or for 8 mm. film, and these different sizes can be simultaneously made in one run of a 35 mm. film at 10. The necessary changes in the optics for each of the different size films will be apparent to those skilled in the art.

It will be apparent from the foregoing that the mechanism shown in connection with the negative film 10 is merely an ordinary projector of any suitable construction, and that the film feeding mechanisms for feeding the plurality of sensitized unexposed films are of any suitable type similar to that used in the projector and that all the films are driven in timed relation, but that this timed relation may be varied if so desired, and that the projector and the mechanism for exposing the sensitized film is all mounted upon a common support and forms a single, unitary structure, including everything necessary to produce the positive films in one run of the apparatus.

What is claimed is:

1. In combination, an optical member comprising a mirror having a principal focus and adapted to receive light therefrom and reflect said light in a beam parallel to the axis of said member, a plurality of beam-deflecting members within the space defined by said beam, each of said last members angularly deflecting a portion of said beam, and a lens in each of said angularly deflected portions of said beam adapted to produce an image of objects located at said principal focus of said mirror.

2. The combination as claimed in claim 1, including a color filter in the entering beam to each of said lenses.

3. The combination as claimed in claim 1, including a support and wherein said optical member is mounted on said support and receives light via said lenses and said beam-deflecting members, said lenses and beam deflecting members being mounted on said support, said mirror directing said light so received to said principal focus.

4. In combination, a support, an optical member comprising a mirror having a principal focus and adapted to receive light therefrom and direct said light in a beam parallel to the axis of said member, a plurality of beam-deflecting members within the space defined by said beam, each of said last members angularly deflecting a portion of said beam, said last members being mounted on said support, a lens in each of said angularly deflected portion of said beam adapted to produce an image of an object located at said principal focus, and means carried on said support for forming image-receiving surfaces in the back focus of said lenses.

5. The combination as claimed in claim 4, wherein a film gate is mounted on said support and located at said principal focus, and a film gate is located in the back focus of each of said lenses, and driving means carried by said support is provided for moving film through all said gates.

6. In combination, a support, an optical member comprising a mirror mounted on said support and having a principal focus and adapted to receive light therefrom and transmit said light in a beam parallel to the axis of said member, a plurality of beam-deflecting members within the space defined by said beam each of said last members angularly deflecting a said portion of said beam and lenses mounted on said support and positioned in said angularly deflected portions of said beam, each lens adapted to produce an image of an object located at said principal focus, and means carried on said support for forming image-receiving surfaces in the back focus of said lenses.

7. The combination as claimed in claim 6, wherein a film gate is mounted on said support and located at said principal focus, and a film gate is located in the back focus of each of said lenses, and driving means carried by said support is provided for moving film through all said gates.

8. The combination as claimed in claim 6, wherein said beam-deflecting members are individually adjustable in respect to the parallel beam of light in which they are placed.

9. The combination as claimed in claim 6, including a film located at the principal focus of said optical member, means mounted on said support for intermittently moving said film, a film forming the image-receiving surfaces in the back focus of each of said lenses, means carried on said support for intermittently moving all said last films, and means for optically projecting a continuous sound track from said first mentioned film to all of said last mentioned films, said last means being mounted on said support.

10. In combination, a support, a mirror mounted thereon having a principal focus and adapted to receive light therefrom and reflect said light in a beam parallel to the axis of said mirror, means for supporting and moving a film transverse the axis of said mirror at the principal focus thereof, means mounted on said support for illuminating said film, a plurality of beam-deflecting members mounted on said support and lying outside the light path between said film and the mirror and adapted to receive the emergent beam from said mirror and to deflect same at an angle to the axis thereof, a plurality of lenses one for each of said beam-deflecting members and adapted to receive the deflected beams therefrom, means on said support for supporting and moving a film transverse the optical axes of each of said lenses at the back focus thereof, all said film moving means being operated in timed relation whereby an image on the film in the principal focus of said mirror may be simultaneously projected via said beam-deflecting members and the lenses associated therewith to produce a plurality of identical images on the last-mentioned separate films at the back foci of said lenses.

11. The combination as claimed in claim 10 wherein means is provided mounted on said support for changing the speed ratio between said films to that the same may be operated at different relative speeds in timed relation.

12. In combination, a projector for negative film including film feeding mechanism, a plurality of film feeding mechanisms for feeding a plurality of separate unexposed sensitized films, a motor for driving all said mechanisms in timed relation to feed said films, an optical member comprising a mirror adapted to receive the emergent beam from said projector, said member adapted to project a parallel beam, and means for axially dividing said parallel beam and directing the parts so divided to the plurality of unexposed films to simultaneously photographically impress an image from said negative film upon each of said unexposed films.

13. In an optical device, a light-gathering member comprising a mirror adapted to receive a cone of light from an object in its principal focus perpendicular to its plane and to direct said light in a beam parallel to its axis, a plurality of beam-deflecting members positioned in said beam and lying outside said cone, and lenses associated with said deflecting members to form images of said object.

14. In combination, a plurality of films, means associated with each of said films including a lens and a mirror in the emergent beam from said lens adapted to reflect images in parallel beams to a main mirror, a main mirror adapted to receive all said projected images, and means located at the principal focus of said mirror for receiving a composite image formed by said projected images.

15. The combination as claimed in claim 14 including means for moving all said films in timed relation, said means for receiving said composite images having a photo-sensitive surface and also moved in timed relation to the movement of other of said films and adapted to receive images reflected thereto by said mirror.

16. The combination as claimed in claim 14 wherein said composite image is formed by superimposing parts of each projected image on each other.

JAMES L. CARLTON.
BRUNO MENIN.

REFERENCES CITED

The following references are of record in the file of this patent:

UNITED STATES PATENTS

| Number | Name | Date |
|---|---|---|
| 1,783,998 | Chretien | Dec. 9, 1930 |
| 1,789,112 | Owens | Jan. 13, 1931 |
| 1,873,302 | Francisco | Aug. 23, 1932 |
| 2,030,795 | Hudley et al. | Feb. 11, 1936 |
| 2,076,103 | Thorner | Apr. 6, 1937 |
| 2,080,463 | Dalotel | May 18, 1937 |
| 2,259,884 | Goldsmith | Oct. 21, 1941 |
| 2,269,161 | Morse | Jan. 6, 1942 |
| 2,389,645 | Sleeper, Jr. | Nov. 27, 1945 |
| 2,492,926 | Valensi | Dec. 27, 1949 |

FOREIGN PATENTS

| Number | Country | Date |
|---|---|---|
| 396,040 | France | Jan. 14, 1909 |
| 462,987 | France | Dec. 6, 1913 |
| 381,531 | Germany | Sept. 21 1923 |
| 209,041 | Great Britain | July 17, 1924 |